US012692917B2

(12) United States Patent
Crippa et al.

(10) Patent No.: US 12,692,917 B2
(45) Date of Patent: Jul. 28, 2026

(54) COVERING PLATE AND BRAKE CALIPER BODY ASSEMBLY WITH A COVERING PLATE

(71) Applicant: Brembo S.p.A., Curno (IT)

(72) Inventors: Cristian Crippa, Curno (IT);
Gianfranco Dell'Acqua, Curno (IT);
Sara Arragoni, Curno (IT)

(73) Assignee: Brembo S.p.A., Bergamo (IT)

( * ) Notice: Subject to any disclaimer, the term of this patent is extended or adjusted under 35 U.S.C. 154(b) by 384 days.

(21) Appl. No.: 18/463,603

(22) Filed: Sep. 8, 2023

(65) Prior Publication Data

US 2024/0084863 A1      Mar. 14, 2024

(30) Foreign Application Priority Data

Sep. 9, 2022      (IT) ........................ 102022000018414

(51) Int. Cl.
F16D 65/00          (2006.01)
F16D 55/00          (2006.01)

(52) U.S. Cl.
CPC ..... F16D 65/0081 (2013.01); F16D 65/0068 (2013.01); *F16D 2055/0016* (2013.01); *F16D 2055/0037* (2013.01)

(58) Field of Classification Search
None
See application file for complete search history.

(56) References Cited

U.S. PATENT DOCUMENTS

| | | | |
|---|---|---|---|
| 8,616,349 B2 | 12/2013 | Kang | |
| 9,046,143 B2 | 6/2015 | Barland | |
| 10,066,687 B2 | 9/2018 | Barland | |
| 10,228,033 B2 | 3/2019 | Barland | |
| 10,378,597 B2 | 8/2019 | Choi | |
| 10,808,780 B2 | 10/2020 | Ryu | |
| 2004/0074716 A1 | 4/2004 | Brumfield et al. | |
| 2009/0152056 A1* | 6/2009 | Heinz ................... | F16D 65/097 |
| | | | 188/73.38 |
| 2010/0163350 A1* | 7/2010 | Bach ..................... | F16D 55/226 |
| | | | 188/73.43 |

(Continued)

FOREIGN PATENT DOCUMENTS

| | | |
|---|---|---|
| EP | 1881472 B1 | 1/2009 |
| EP | 2018490 B1 | 2/2020 |

(Continued)

OTHER PUBLICATIONS

Italian Patent and Trademark Office, Search Report in Application No. IT202200018414, dated Apr. 24, 2023, 7 pages.

*Primary Examiner* — Melanie Torres Williams

(74) *Attorney, Agent, or Firm* — Marshall & Melhorn, LLC

(57) ABSTRACT

A plate unusually capable of safe coupling and anti-accidental extraction may have a body which covers a portion of a caliper body. The body may have a front surface, a rear surface and a coupling element for coupling the caliper body. The coupling element may have two coupling arms which protrude in a cantilevered manner. Each of the coupling arms may have a strut. The strut may protrude in a cantilevered manner from the coupling arm. The strut may also have a free end. The struts of the arms form at least one pair being mutually opposite and converging so as to apply a pair of actions which are mutually converging.

11 Claims, 10 Drawing Sheets

(56)                    References Cited

U.S. PATENT DOCUMENTS

2013/0291418 A1    11/2013  Mallmann et al.

FOREIGN PATENT DOCUMENTS

| | | | |
|---|---|---|---|
| JP | 5715932 | B2 | 5/2015 |
| KR | 20170083288 | A | 7/2017 |
| KR | 20170139879 | A | 12/2017 |
| WO | 2020231145 | A1 | 11/2020 |
| WO | 2021215436 | A1 | 10/2021 |

* cited by examiner

COVERING PLATE AND BRAKE CALIPER BODY ASSEMBLY WITH A COVERING PLATE

FIELD

The present invention relates to a covering plate, also known as aesthetic plate or "logo plate", "aesthetic skin plate", "protective cover" or "guard screen", as well as to a brake caliper body and covering plate assembly associated therewith.

In particular, the present invention relates to a covering plate connectable to a brake caliper body, and more specifically to a covering plate mounted to the brake caliper body.

BACKGROUND

In a disc brake, the brake caliper is generally arranged straddling a brake disc mounted to the hub of a vehicle wheel. The brake caliper usually comprises a caliper body accommodating the brake pads, and actuators for pushing the pads against the disc to achieve the braking action on the vehicle.

The brake caliper body is an unsprung mass of the vehicle and is designed to be as light as possible and at the same time as resistant as possible to the deformation actions generated by the braking action on the brake disc.

These brake caliper bodies are often visible on the side facing the spokes of the wheel rims of the vehicle or entirely visible, in the case of motorcycles.

Various styling options are requested by vehicle manufacturers when ordering the disc brakes as described above. Most of them require the addition of aesthetic parts that condition the styling, e.g., parts of the caliper body or plates showing the vehicle manufacturer's logo. Moreover, since disc brakes are installed so as to be visible and identifiable from the outside of the vehicle, as mentioned through the spokes of the rims which leave increasingly large windows, it is desirable to install a plate or label with a manufacturer's logo or a logo with other desired advertising effect.

Solutions of this type are known, for example, from U.S. Pat. No. 9,046,143B2, KR20170083288A, U.S. Ser. No. 10/808,780B1, U.S. Ser. No. 10/378,597, EP1881472B1, US2004074716A1, JP5715932B2, U.S. Ser. No. 10/066,687B2, U.S. Ser. No. 10/228,033, U.S. Ser. No. 10/378,597, U.S. Ser. No. 10/228,033, U.S. Pat. No. 8,616,349, U.S. Ser. No. 10/378,597, U.S. Ser. No. 10/228,033, U.S. Pat. No. 8,616,349, EP2018490B1.

In particular, WO2020231145A1 to Mando Corp. describes a "logo plate" made of plastic material in which opposite hooks fit into opposite caliper body housings. This solution does not ensure that a cross action of the opposite hooks is applied and, moreover, it does not allow a preload action on the hooks, which will keep the plate firmly coupled to the caliper body over time. Especially, the present solution does not ensure that the disassembly of the plate from the caliper body is prevented except in a complex manner. The action of the hooks is directed according to mutually parallel directions, making the overall action on the plate uncertain and imprecise. Moreover, even if a hook is inserted as an undercut manner into a housing of the caliper body, in this solution it is sufficient to lift the hook with a screwdriver even from one side to remove the plate.

Other solutions are known from US2009152056A1, which shows the solution of a plate which is coupled as an undercut but not so as to prevent the even accidental extraction thereof from the caliper body, and from US2013291418A1 to Lucas Automotive GmbH, which shows a dissymmetric solution and which is designed explicitly and specifically to be easy to remove, thus suggesting a solution which serves an opposite purpose to that sought to be solved here.

Therefore, the need is still felt to couple a covering plate to the caliper body in an easy to mount but at the same time safe manner, and that does not simultaneously lose the coupling to the caliper body.

In an alternative embodiment, it is desired that the covering plate cannot be removed from the outer side of the brake caliper body unless by irreparably deforming the connection. Conversely, the plate can be removed without damage by acting on the inner side with a tool, e.g., a screwdriver.

SUMMARY

It is the object of the present invention to provide a covering plate, as well as a brake caliper body and covering plate assembly, which are easy to manufacture and install wile allowing the maximum certainty that the covering plate will not accidentally separate from the brake caliper body when using the brake caliper.

This and other purposes and advantages are achieved by a covering plate according to claim 1, as well as by brake caliper body and covering plate assembly according to claim 10.

Some advantageous embodiments are the subject of the dependent claims.

From the analysis of this solution, it was found that the suggested solution allows simplifying the covering plate and simultaneously achieving a greater safety of the connection between the covering plate and the brake caliper body.

According to an embodiment, the provision of at least one coupling element with at least two arms with at least two opposite struts, inclined and directed in directions converging towards the rear plate surface, ensures very high safety, inter alia related to the fact that any disassembly operation must occur by operating on both mutually opposite struts.

The provision of an inclined strut action also allows obtaining an automatic centering of the covering plate with respect to the support surfaces of the struts provided in the brake caliper body.

Moreover, according to a further embodiment, the support of the coupling element abutment surface against the brake caliper body directed in the direction opposite to the action applied by the struts to the brake caliper body creates an elastic preload in the at least one coupling element which prevents accidental separations between the covering plate and the brake caliper body, even in case of even quite violent impacts against the covering plate.

Still further, according to a further embodiment, the support of the coupling element abutment surface against the brake caliper body directed in the direction opposite to the action applied by the struts to the brake caliper body can create a further elastic preload in the at least one coupling element which prevents the covering plate from being tampered with. Indeed, by virtue of this preload, any action of uncoupling the struts that occurs from the outer side and without the appropriate tools would cause the plastic deformation thereof and thus the impossibility of a further use thereof, thus making tampering useless.

DESCRIPTION OF THE FIGURES

Further features and advantages of the covering plate and the brake caliper body and covering plate assembly are given by way of non-limiting indication, with reference to the accompanying drawings, in which.

DETAILED DESCRIPTION

Figure 1:
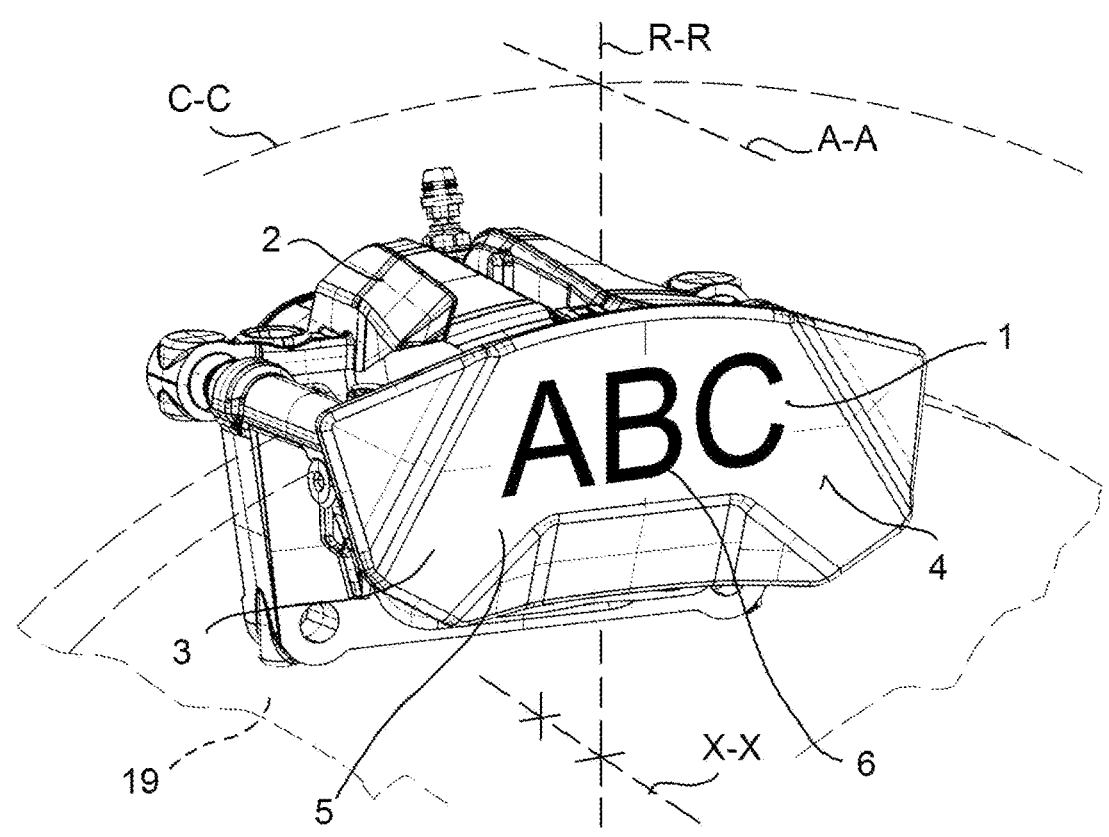
FIG. 1 is in axonometric view of a brake caliper mounted straddling a brake disc, shown here in dashed lines, on the wheel side, in which the plate body is obtained from sheared and shaped sheet metal.
Figure 2:
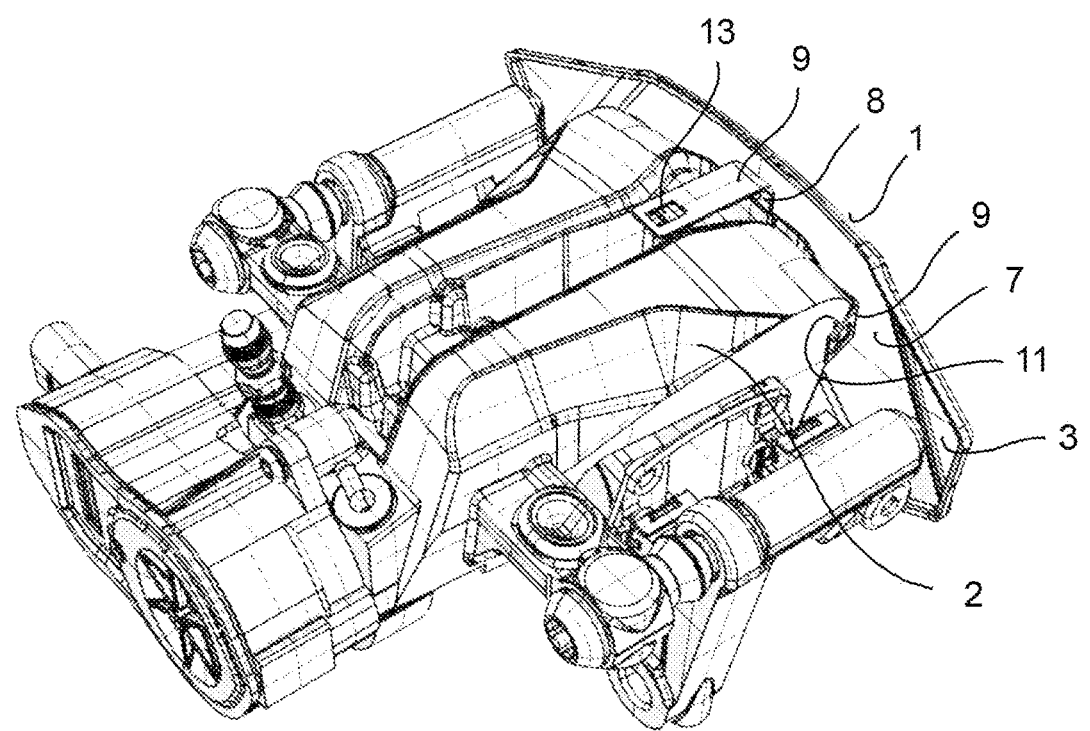
FIG. 2 is an axonometric view of the caliper in FIG. 1 from the outer radial and axial side on the vehicle side.
Figure 3:
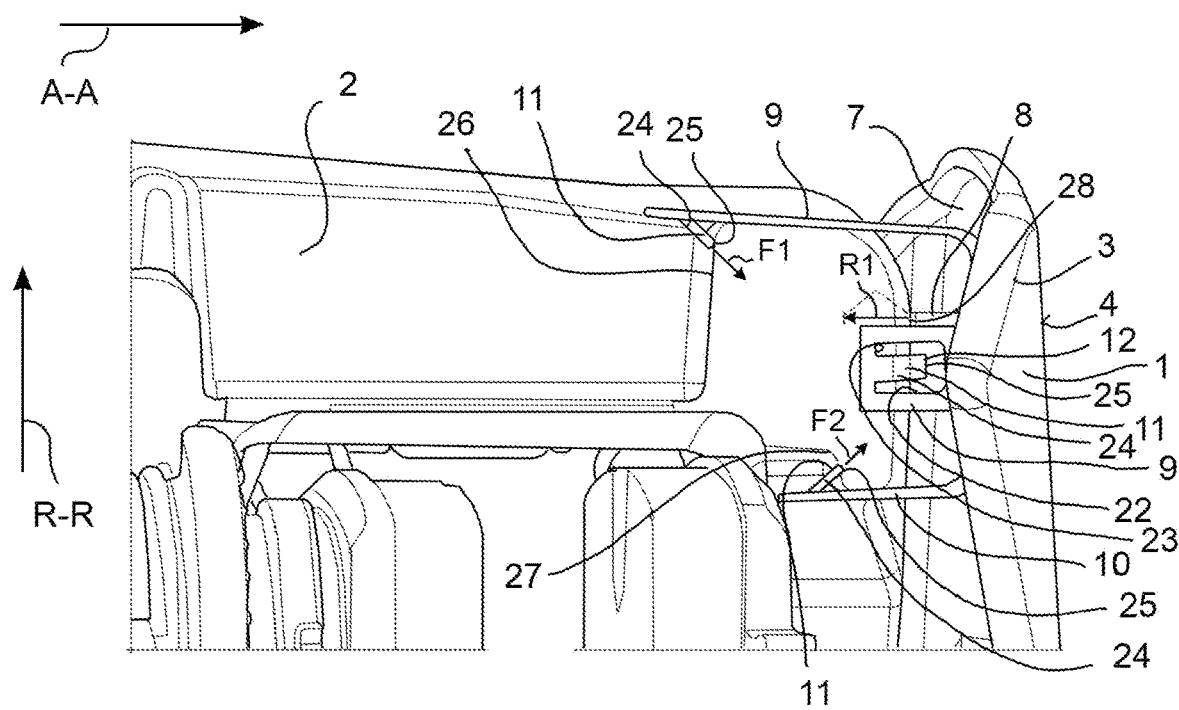
FIG. 3 is an axonometric section view of the brake caliper in FIG. 1 taken along a plane, containing the radial and axial directions, highlighting a coupling element of a covering plate with the opposite coupling arms thereof and the pair of struts with converging actions.
Figure 4:
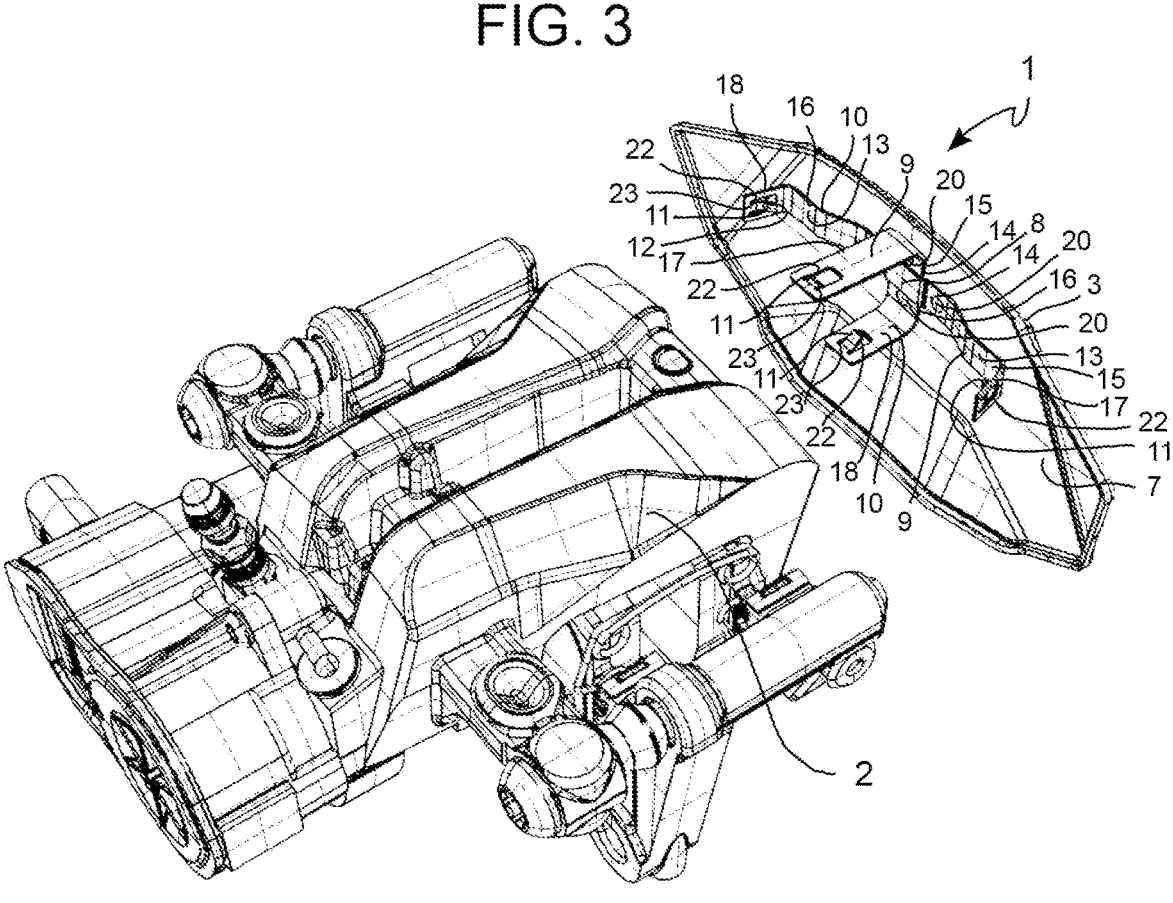
FIG. 4 is an axonometric view of the brake caliper in FIG. 2 with parts separated, in which the covering plate is separated from the brake caliper body.
Figure 5:
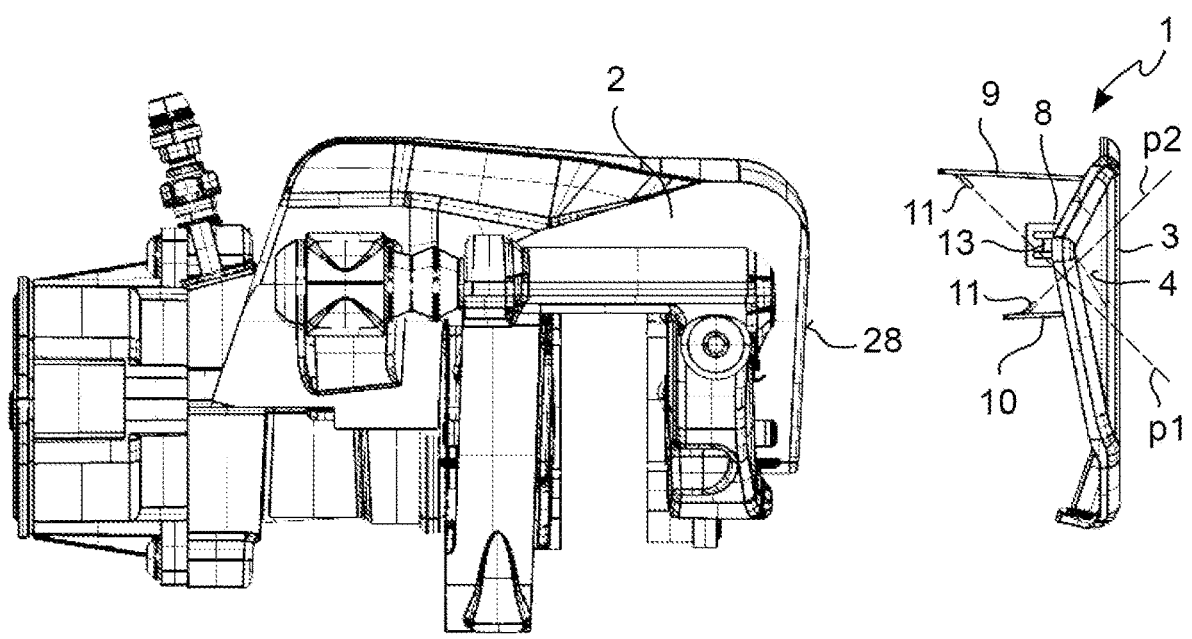
FIG. 5 is a lateral (i.e., circumferential) view of the caliper in FIG. 4.
Figure 6:
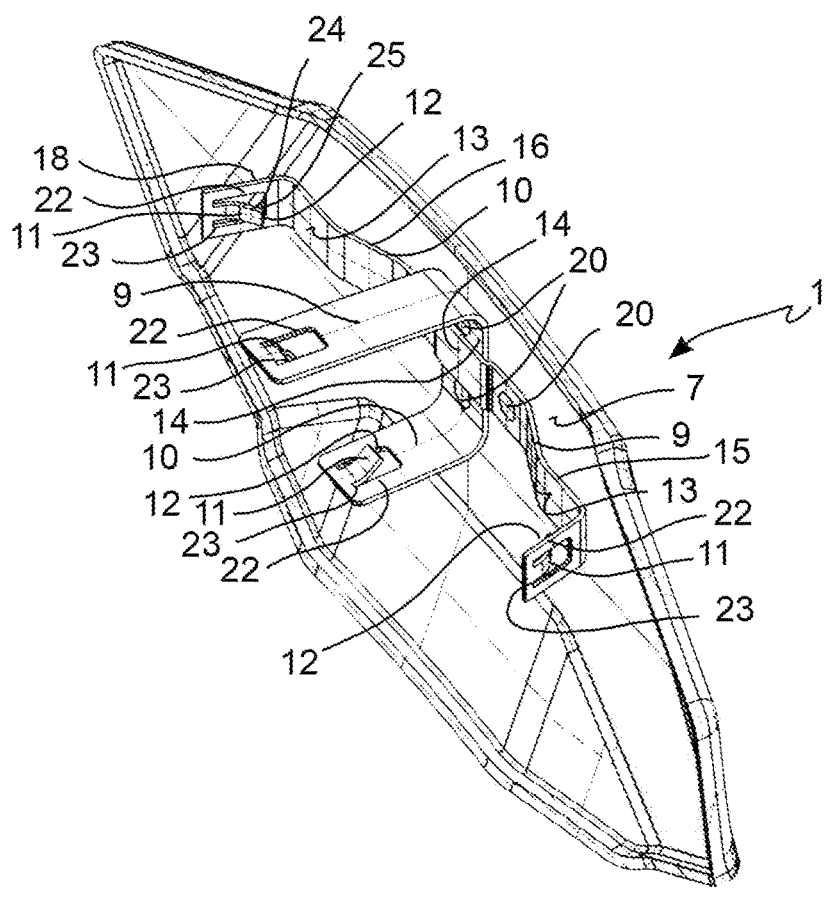
FIG. 6 is an axonometric view of the covering plate from the side thereof facing the brake caliper body.
Figure 8:
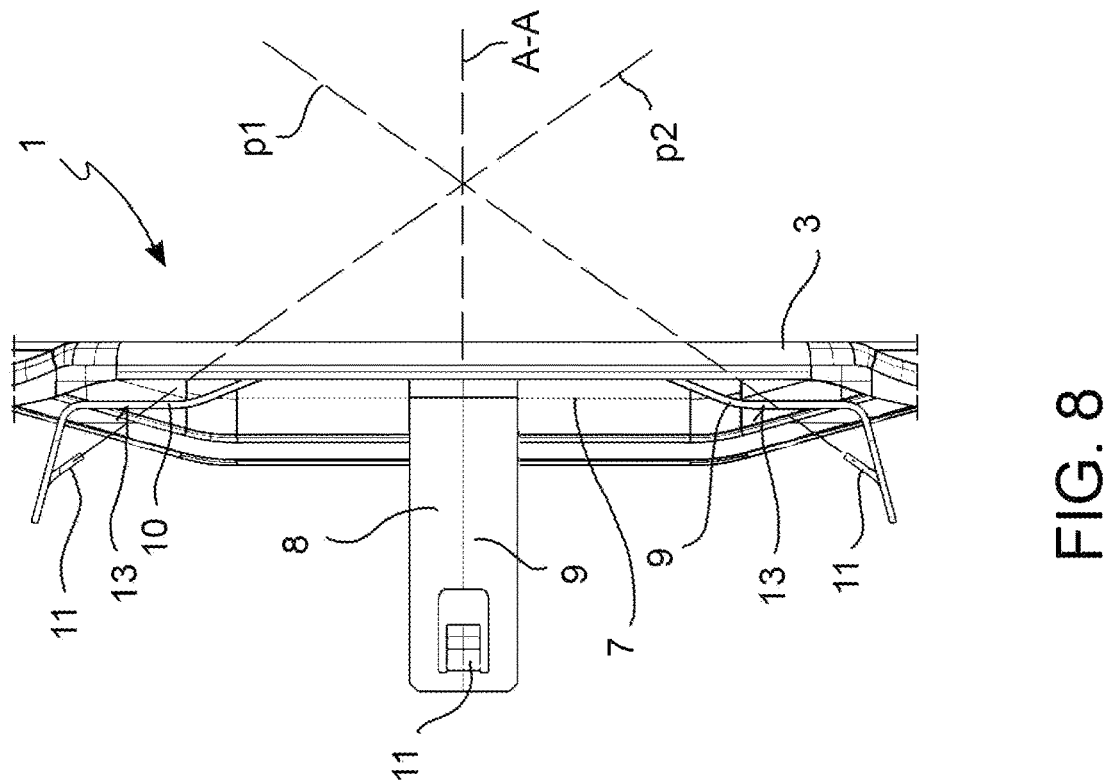
FIGS. 7 and 8 are views from the radially outward direction of the covering plate in FIG. 6, as well as an enlargement to highlight a first pair of struts having converging extension directions.
Figure 7:
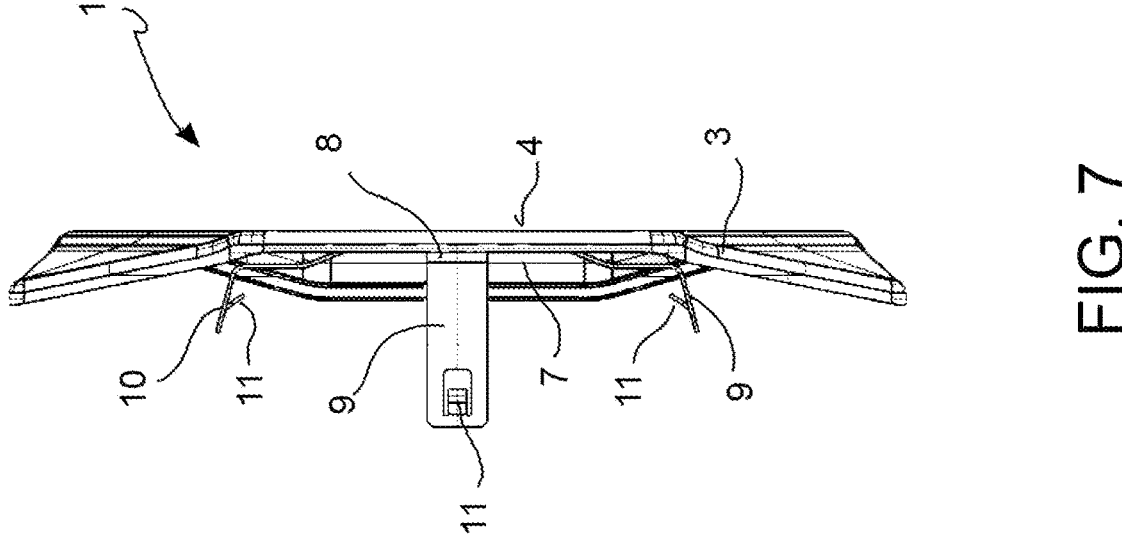
Figure 9:
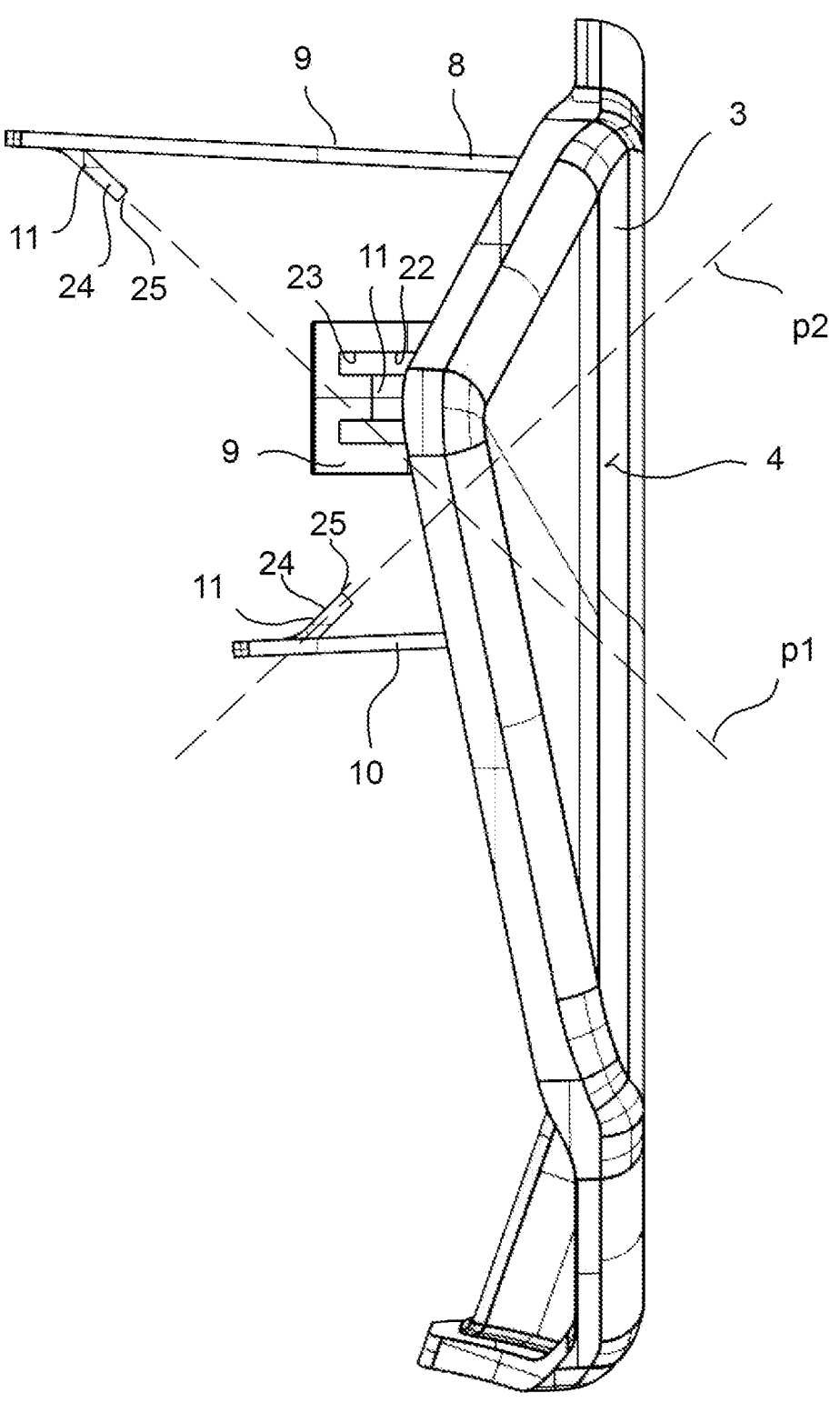
FIG. 9 is a lateral (i.e., circumferential) view of the covering plate in FIG. 6, in which a second pair of struts having converging extension directions is highlighted.
Figures 10, 11:
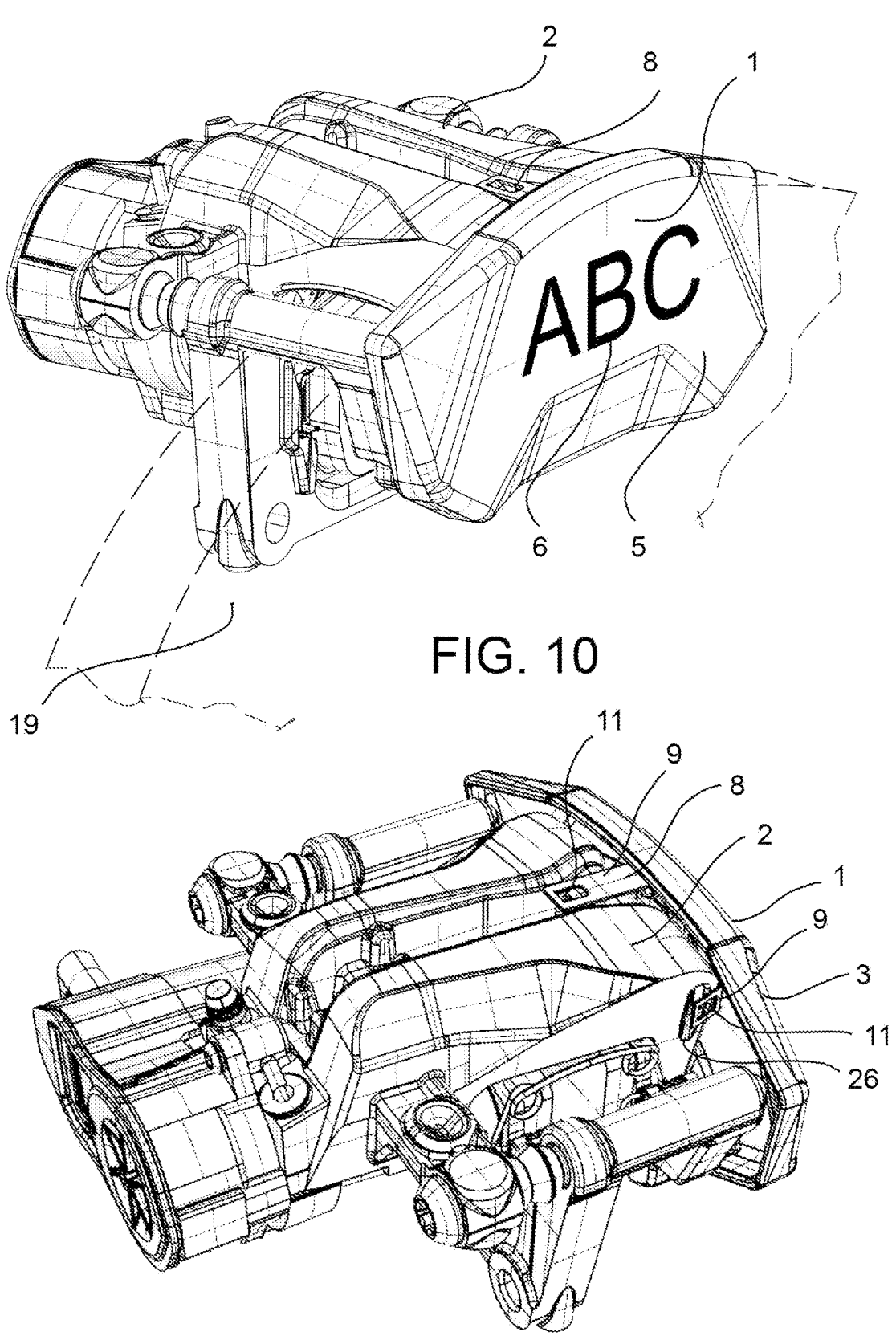
FIG. 10 is an axonometric view of a brake caliper, according to a further embodiment, mounted straddling a brake disc, shown here in dashed lines, on the wheel side, where the plate body is made by molding or casting.
FIG. 11 is an axonometric view of the caliper in FIG. 10 from the outer radial and axial side on the vehicle side.
Figures 12, 13:
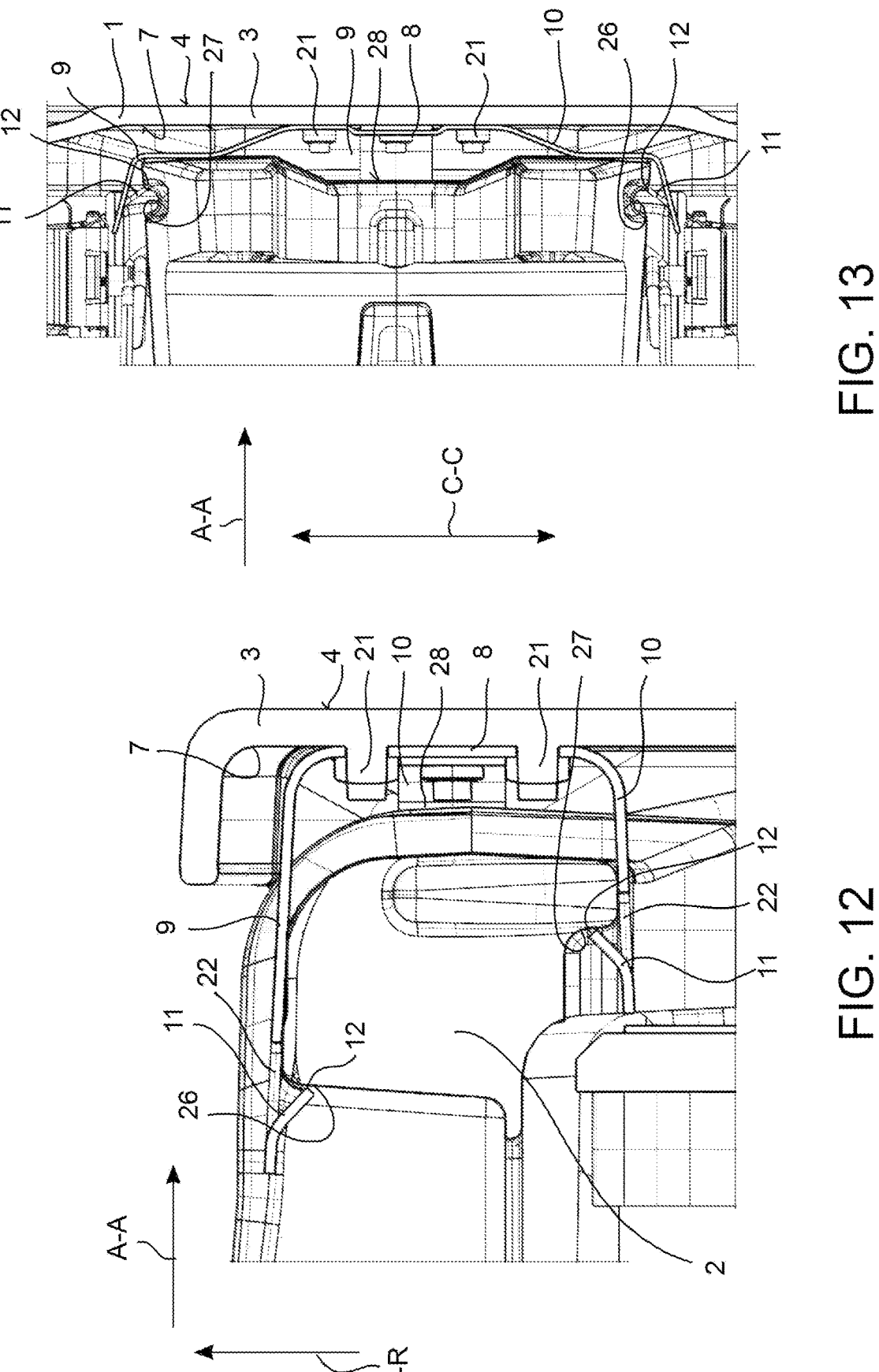
FIG. 12 is a lateral (i.e., circumferential) section view, taken along a plane containing the radial and axial directions, of the brake caliper in FIG. 10, highlighting a coupling element of a covering plate with the opposite coupling arms thereof and a second pair of struts with converging actions.
FIG. 13 is a top (i.e., outer radial) section view taken along a plane containing the circumferential and axial directions, or more precisely tangential at a point of intersection between a circumferential direction and an axial one and the axial direction, of the brake caliper in FIG. 10, highlighting the coupling element of the covering plate with the additional opposite coupling arms thereof and a first pair of struts with converging actions.
Figure 14:
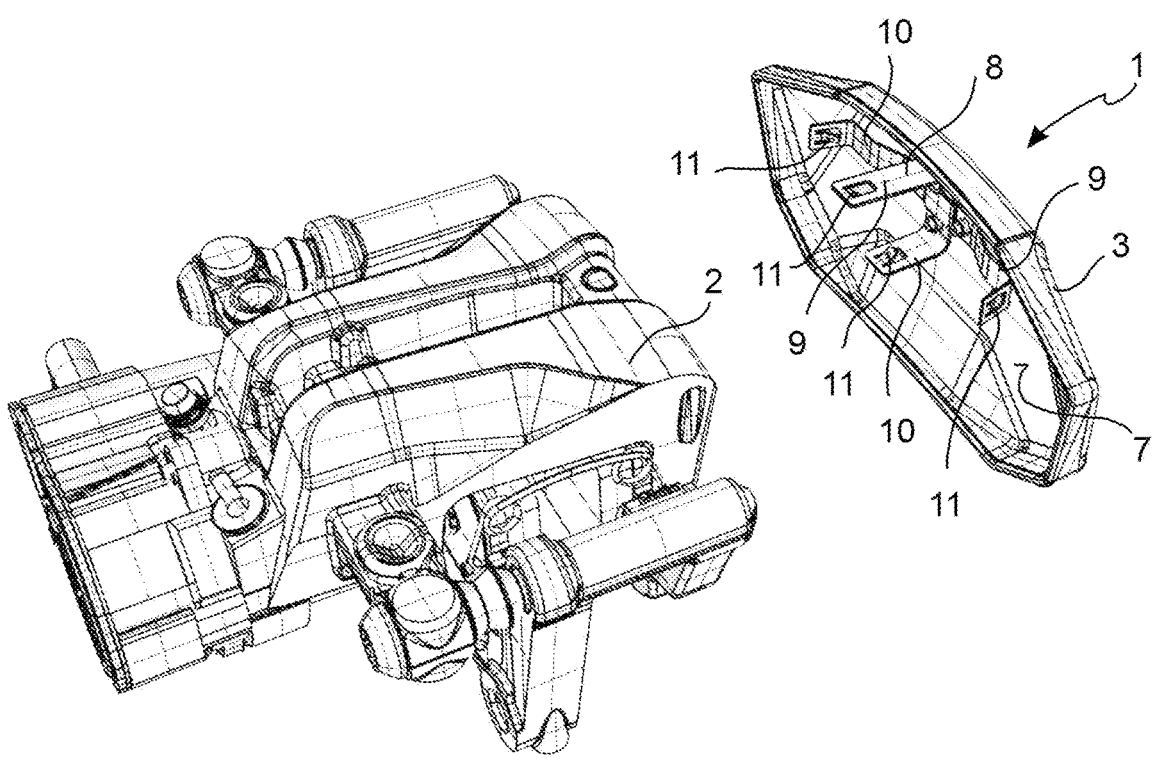
FIG. 14 is an axonometric view of the brake caliper in FIG. 11 with parts separated, where the covering plate is separated from the brake caliper body.
Figure 15:
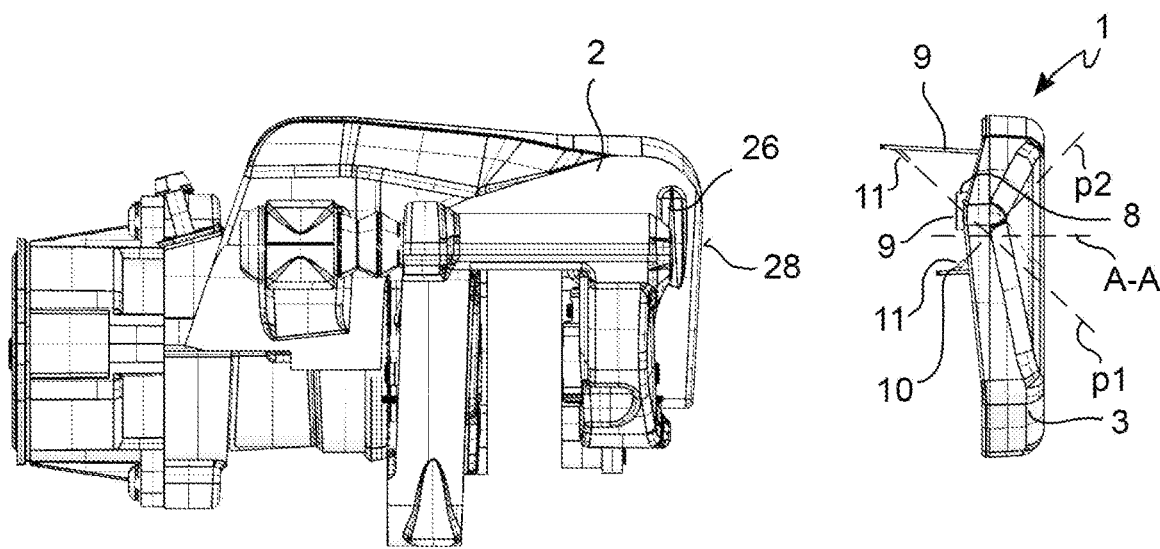
FIG. 15 is a lateral (i.e., circumferential) view of the caliper in FIG. 14.
Figure 16:
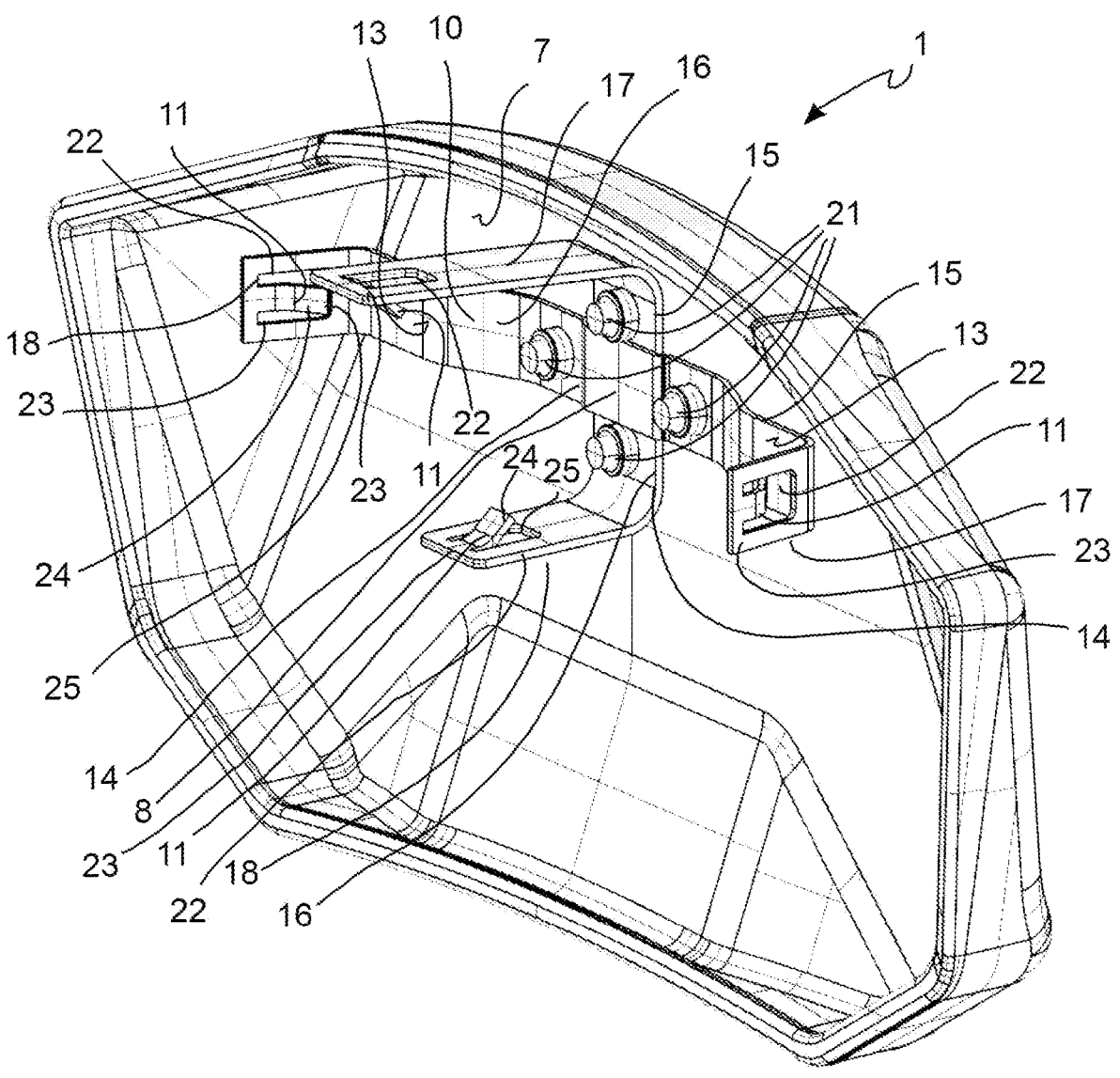
FIG. 16 is an axonometric view of the covering plate from the side thereof facing the brake caliper body.
Figure 17:
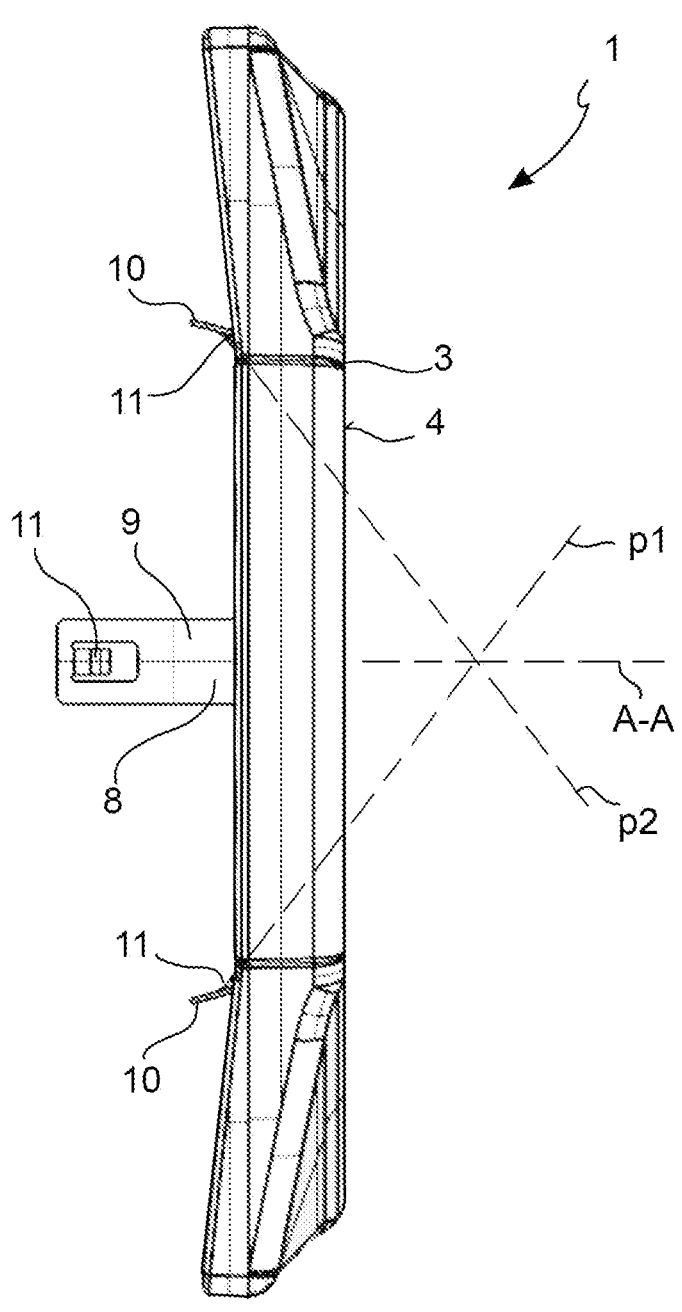
FIG. 17 is a view taken along the outer radial direction of the covering plate in FIG. 16.

A brake caliper body 2 is adapted to house thrust means to bias opposing brake pads against opposite braking surfaces of a brake disc 19 to which said caliper body 2 is adapted to be arranged in a straddling manner.

Said brake disc 19 defines an axial direction A-A, parallel to or coincident with a rotation axis X-X of said brake disc 19, a radial direction R-R, orthogonal to said rotation axis X-X, and a circumferential direction C-C which, in each intersection point between said axial direction A-A and said radial direction R-R, is orthogonal to both said axial direction A-A and said radial direction R-R.

According to an embodiment, a covering plate 1 is mountable to a brake caliper body 2.

Said covering plate comprises a plate body 3 adapted to cover at least one portion of said brake caliper body 2.

Said plate body 3 comprises a front plate surface 4 adapted to be arranged opposite to said brake caliper body 2 and forming at least one display portion 5 adapted to support a logo 6.

Said plate body 3 comprises a rear plate surface 7 opposite to said front plate surface 4 and adapted to face said brake caliper body 2.

Said covering plate 1 further comprises at least one coupling element 8 for coupling the covering plate 1 to the brake caliper body 2.

Said coupling plate 8 comprises at least two coupling arms 9, 10 which, when the covering plate 1 is removed from the brake caliper body 2, protrude in a cantilevered manner from said rear plate surface 7.

Each of said coupling arms 9, 10 comprises at least one strut 11. Said strut 11 of each of said coupling arms 9, 10 protrudes in a cantilevered manner from said coupling arm 9, 10 and comprises a free strut end 12 facing said rear plate surface 7.

Said at least one strut 11 for each of said coupling arms 9, 10 forms at least one pair of struts 11 opposite to each other and arranged inclined on mutually converging directions p1, p2.

Alternatively, according to an embodiment, said at least one strut 11 for each of said coupling arms 9, 10 forms at least one pair of struts 11 opposite to each other and inclined and mutually converging so as to apply, when the covering plate 1 is coupled to the brake caliper body 2, a pair of strut actions F1, F2 arranged on mutually converging directions p1, p2.

According to an embodiment, said mutually converging directions p1, p2 intersect at an expected point on an axial direction A-A passing through the center of gravity of the covering plate 1.

According to an embodiment, at least one coupling element portion of the coupling element 8 forms at least one coupling element abutment surface 13 for the support against the brake caliper body 2 of the covering plate 1.

According to an embodiment, said at least one coupling element abutment surface 13 faces at least one of said struts 11 and is adapted to form at least one reaction action R1, R2 opposite to at least one strut action F1, F2, e.g., not exactly with the same direction and opposite way, but directed in an axial direction A-A however with an inclined way that forms a component opposite to the strut action F1, F2, and keep the struts 11 compressed when in operation.

According to an embodiment, said coupling element 8, at least in the part thereof forming said at least one pair of mutually opposite, inclined, and converging struts 11, is in one piece.

According to an embodiment, said coupling element 8 comprises a coupling element fixing portion 14 fixed to said plate body 3.

According to an embodiment, said coupling element 8 comprises said coupling arm 9, 10 arranged mutually opposite and protruding in a cantilevered manner from said coupling element fixing portion 14.

According to an embodiment, said coupling element 8 comprises a coupling arm position 17, 18 which protrudes in a cantilevered manner away from said plate body 3 when said covering plate 1 is not in operation.

According to an embodiment, said coupling element 8 comprises a coupling element fixing portion 14 fixed to said plate body 3.

According to an embodiment, said coupling element 8 comprises said coupling arm 9, 10 arranged mutually opposite and protruding in a cantilevered manner from said coupling element fixing portion 14.

According to an embodiment, a first coupling arm portion 15, 16 of at least one of said coupling arms 9, 10 is arranged raised from the plate body 3 and extends facing said plate body 3 and forms at least one coupling element abutment surface 13 to support said covering plate 1 against said brake caliper body 2.

According to an embodiment, said at least one coupling element abutment surface 13 faces, directly when the covering plate 1 is not mounted, at least one of said struts and is adapted to form a reaction action R1, R2 opposite to at least one strut action F1, F2 and keep the struts 11 compressed when in operation.

According to an embodiment, said coupling arm 9, 10 each comprise a second coupling arm position 17, 18 which protrudes in a cantilevered manner away from said plate body 3 when said covering plate 1 is not in operation.

According to an embodiment, said two second coupling arm positions 17, 18 extend substantially parallel to each other.

According to an embodiment, said coupling element 8 comprises two parts forming two pairs of coupling arm 9, 10.

According to an embodiment, said brake caliper body 2 is adapted to be arranged straddling the outer edge of a brake disc 19 adapted to rotate about a brake disc rotation axis X-X and defining an axial direction A-A either coincident with or parallel to said brake disc rotation axis; a radial direction R-R orthogonal in any point to said brake disc rotation axis X-X; and a circumferential direction C-C which at any intersection point between an axial A-A and radial R-R directions is orthogonal thereto.

According to an embodiment, said coupling element 8 comprises two parts forming two pairs of coupling arm 9, 10.

According to an embodiment, a first pair of coupling arms 9, 10 is adapted to grasp said brake caliper body 2 on the opposite sides thereof, which are arranged substantially on two planes each comprising a circumferential direction C-C and a radial direction R-R, in the figures on the right and left of the brake caliper body.

According to an embodiment, a second pair of coupling arms 9, 10 is adapted to grasp said brake caliper body 2 on the opposite sides thereof which are arranged substantially on two planes each comprising a circumferential direction C-C and an axial direction A-A in the top and bottom figures.

According to an embodiment, said brake caliper body 2 is adapted to be arranged straddling the outer edge of a brake disc 19 adapted to rotate about a brake disc rotation axis X-X and defining an axial direction A-A either coincident with or parallel to said brake disc rotation axis; a radial direction R-R orthogonal in any point to said brake disc rotation axis X-X; and a circumferential direction C-C which at any intersection point between an axial A-A and radial R-R directions is orthogonal thereto.

Said coupling element 8 comprises two parts forming two pairs of coupling arms 9, 10.

A first pair of coupling arms 9, 10 grasps said brake caliper body 2 on its opposite sides transverse to a circumferential direction C-C or sides parallel to a radial direction R-R.

A second pair of coupling arms 9, 10 grasp said brake caliper body 2 in its opposite sides either transverse to a radial direction R-R or parallel to an axial direction A-A.

According to an embodiment, said coupling element 8 comprises two pairs of mutually orthogonal coupling 9, 10.

According to an embodiment, said coupling element 8 comprises two parts forming two pairs of mutually orthogonal coupling arms 9, 10.

According to an embodiment, said coupling element 8 comprises a contoured leaf-like coupling element body.

According to an embodiment, said coupling element 8 comprises a leaf spring.

According to an embodiment, said coupling element 8 comprises a spring-steel leaf spring.

According to an embodiment, said coupling element 8 is fixed to the plate body 3 by means of at least one rivet 20.

According to an embodiment, said coupling element 8 is fixed to the plate body 3 by gluing.

According to an embodiment, said coupling element 8 is fixed to the plate body 3 by at least one fixing element, e.g., at least one screw 21.

According to an embodiment, each of said coupling arms 9, 10 comprises at least one arm slot 22; said at least one arm slot 22 is delimited by a slot edge 23 and where said strut 11 protrudes in a cantilevered manner from said slot edge 23.

According to an embodiment, said strut 11 is formed by a straight strut leaf portion 24 having a strut end edge 25 adapted to rest on the brake caliper body 2 and create a support on the brake caliper body 2 which applies a compression action in the straight strut leaf portion 24, i.e., a tip load for the strut which creates a preload in the coupling element 8 and contrasts the removal or separation of the covering plate 1 from the brake caliper body 2, when said covering plate 1 is mounted to said brake caliper body 2.

According to an embodiment, said caliper body 3 is a sheared and stamped plate.

According to an embodiment, said plate body 3 is made by casting.

According to an embodiment, said plate body 3 is obtained by hot or cold stamping from a metal billet.

The present invention further relates to an assembly comprising at least one covering plate 1, according to any one of the embodiments described above, and a brake caliper body 2.

According to an embodiment, said brake caliper body 2 comprises at least one pair of mutually opposite coupling housings 26, 27 adapted to receive said at least one pair of mutually opposite, inclined, and converging struts 11.

According to an embodiment, said brake caliper body 2 comprises at least one caliper body front support surface 28 adapted to receive the support of said at least one coupling element 8.

According to an embodiment, said brake caliper body 2 comprises at least one caliper body front support surface 28 adapted to receive the support of a coupling element abutment surface 13 of said at least one coupling element 8.

By virtue of the described solutions, it is possible to mount a covering plate to a brake caliper body in a simple but at the same time safe manner so as to avoid accidental disconnection or separation between the covering plate and the brake caliper body.

The suggested solutions are also tamper-proof because, during the assembly, the inclined struts are elastically deformed by folding them toward the coupling arms and facilitating the coupling and in particular the insertion of the struts until they snap into the housings of the brake caliper body, thus resulting in a visual but also audible signal of the safe coupling, and by virtue of the suggested solutions it is determined the impossibility of disassembling the covering plate from the brake caliper body.

Advantageously, the pair of converging actions directed in the extraction direction created by the pair of struts resting against the caliper body prevents any extraction movement except by forcing the strut to retract by means of a tool. Using a tool simultaneously on both coupling arms makes accidental disassembly impossible.

According to an embodiment, the solution can also be tamper-proof. Indeed, the pair of converging actions directed in the extraction direction created by the pair of struts supported and elastically preloaded against the caliper body, by virtue of the opposite support of the coupling element abutment surface against the brake caliper body, prevents any extraction movement unless by forcing the strut to retract by means of a tool (forcing the coupling element to be preloaded even more up to a permanent deformation of the coupling element, e.g., outward and away from the brake caliper body).

In particular, the fact of having to work simultaneously on both sides of the brake caliper body, i.e., on both opposite struts, makes the solution particularly safe.

In particular, by forcing with a pair of tools, which is per se already complex to do in synchrony, each tool acts on the strut causing it to retract (forcing the coupling arms to be preloaded even more) and plastically deforming each strut outward.

LIST OF REFERENCE SIGNS 1 covering plate or protective cover or guard screen or aesthetic skin plate
2 brake caliper body
3 plate body
4 front plate surface
5 display portion
6 logo
7 rear plate surface
8 coupling member
9 coupling arm
10 coupling arm
11 strut
12 free strut end
13 coupling element abutment surface
14 coupling element fixing portion
15 first coupling arm portion
16 first coupling arm portion
17 second coupling arm portion
18 second coupling arm portion
19 brake disc
20 rivet
21 screw
22 arm slot
23 slot edge
24 straight strut leaf portion
25 strut end edge
26 caliper body coupling housing
27 caliper body coupling housing
28 caliper body front support surface
X-X brake disc rotation axis
A-A axial direction
R-R radial direction
C-C circumferential direction
p1 direction of action of the first strut
p2 direction of action of the second strut
F1 action of the first strut F2 action of the second strut
R1 reaction action
R2 reaction action

The invention claimed is:

1. A covering plate mountable on a brake caliper body, comprising a plate body adapted to cover at least one portion of said brake caliper body;
    said plate body comprising a front plate surface adapted to be arranged opposite to said brake caliper body and which forms at least one display portion adapted to support a logo;
    said plate body comprising a rear plate surface opposite to said front plate surface and adapted to face said brake caliper body;
    wherein said covering plate further comprises at least one coupling element for coupling the covering plate to the brake caliper body;
    wherein said covering plate comprises at least two coupling arms, which, when the covering plate is removed from the brake caliper body, protrude cantilevered from said rear plate surface;
    each of said coupling arms comprises at least one strut;
    wherein said strut protrudes cantilevered from said coupling arm and comprises a free strut end facing towards said rear plate surface;
    and wherein said struts of said coupling arms form at least one pair of mutually opposite and inclined struts arranged on mutually converging directions,
    each of said coupling arms comprises at least one arm slot; said at least one arm slot is delimited by a slot edge and wherein said strut protrudes cantilevered from said slot edge;
    and/or wherein
    said strut is formed by a strut straight leaf portion having a strut end edge adapted to rest on the brake caliper body and create a rest on the brake caliper body which applies a compression action in the strut straight leaf portion, which creates a preload in the coupling element and contrasts the removal or separation of the covering plate from the brake caliper body, when said covering plate is mounted on said brake caliper body.

2. A covering plate according to claim 1, wherein at least one coupling element portion of the coupling element forms at least one coupling element abutment surface for the resting against the brake caliper body of the covering plate; wherein said at least one coupling element abutment surface faces at least one of said struts and is adapted to form at least one reaction action opposite to at least one strut action and maintain the struts in compression when in service.

3. A covering plate according to claim 1, wherein said coupling element, at least in its part which forms said at least one pair of mutually opposite, inclined, and converging struts, is in one piece.

4. A covering plate according to claim 1 wherein said coupling element comprises a coupling element fixing portion fixed to said plate body; and wherein said coupling element comprises said coupling arms arranged mutually opposite and protruding cantilevered from said coupling element fixing portion;
    and wherein said coupling element comprises a coupling arm position which protrudes cantilevered away from said plate body when said covering plate is not in service;
    or wherein
    said coupling element comprises a coupling element fixing portion fixed to said plate body; and wherein said coupling element comprises said coupling arms arranged mutually opposite and protruding cantilevered from said coupling element fixing portion; and wherein a first coupling arm portion of at least one of said coupling arms is arranged raised from plate body and extends facing said plate body and forms at least one coupling element abutment surface to rest said covering plate against said brake caliper body;

wherein said at least one coupling element abutment surface faces, directly when the covering plate is not mounted, at least one of said struts and is adapted to form a reaction action opposite to at least one strut action and keep the struts in compression when in service;

and wherein said coupling arm each comprise a second coupling arm position which protrudes cantilevered away from said plate body when said covering plate is not in service;

and/or wherein said two second positions of the coupling arm extend substantially parallel to each other.

5. A covering plate according to claim 1 wherein said coupling element comprises two parts which form two pairs of coupling arms;

or said brake caliper body is adapted to be arranged straddling the outer edge of a brake disc adapted to rotate about a brake disc rotation axis and defining an axial direction either coincident or parallel with said brake disc rotation axis; a radial direction orthogonal at any point to said brake disc rotation axis; and a circumferential direction which at any point of intersection between an axial and radial directions is orthogonal thereto;

said coupling element comprises two parts forming two pairs of coupling arms; and wherein a first pair of coupling arms is adapted to grasp said brake caliper body on its opposite sides which are arranged substantially on two planes each comprising a circumferential direction and a radial direction; and wherein a second pair of coupling arms is adapted to grasp said brake caliper body on its opposite sides which are arranged substantially in two planes each comprising a circumferential direction and an axial direction;

or said brake caliper body is adapted to be arranged straddling the outer edge of a brake disc adapted to rotate about a brake disc rotation axis and defining an axial direction either coincident or parallel with said brake disc rotation axis; a radial direction orthogonal at any point to said brake disc rotation axis; and a circumferential direction which at any point of intersection between an axial and radial directions is orthogonal thereto;

said coupling element comprises two parts forming two pairs of coupling arms; and wherein a first pair of coupling arms grasp said brake caliper body in its opposite sides transverse to a circumferential direction or sides parallel to a radial direction; and wherein a second pair of coupling arms grasp said brake caliper body in its opposite sides either transverse to a radial direction or parallel to an axial direction.

6. A covering plate according to claim 1 wherein said coupling element comprises two pairs of mutually orthogonal coupling arms;

or wherein said coupling element comprises two parts forming two pairs of mutually orthogonal coupling arms;

and/or wherein said coupling element comprises a contoured leaf-like coupling element body;

and/or wherein said coupling element comprises a leaf spring;

and/or wherein said coupling element comprises a spring-steel leaf spring.

7. A covering plate according to claim 1 wherein said coupling element is fixed to the plate body by means of at least one rivet;

or wherein said coupling element is fixed to the plate body by gluing;

or wherein said coupling element is fixed to the plate body by at least one fixing element.

8. A covering plate according to claim 1 wherein said plate body is a punched and stamped metal sheet;

or wherein said plate body is obtained by casting;

or wherein said plate body is obtained by hot or cold stamping from a metal billet.

9. An assembly comprising at least one covering plate according to claim 1 and a brake caliper body.

10. An assembly according to claim 9, wherein said brake caliper body comprises at least one pair of mutually opposite coupling housings adapted to receive said at least one pair of mutually opposite, inclined and converging struts.

11. An assembly according to claim 9, wherein said brake caliper body comprises at least one caliper body front support surface adapted to receive the support of said at least one coupling element;

or wherein said brake caliper body comprises at least one caliper body front support surface adapted to receive the support of a coupling element abutment surface of said at least one coupling element.

* * * * *